Feb. 24, 1925.
F. WÜST
RINGING MECHANISM FOR BELLS AND THE LIKE
Filed Dec. 5, 1922
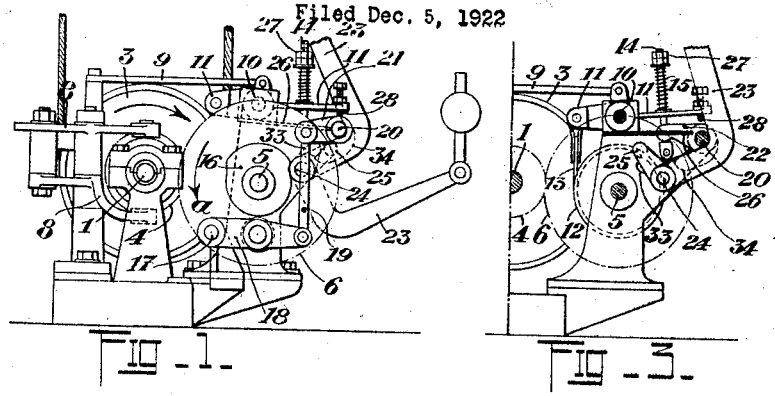
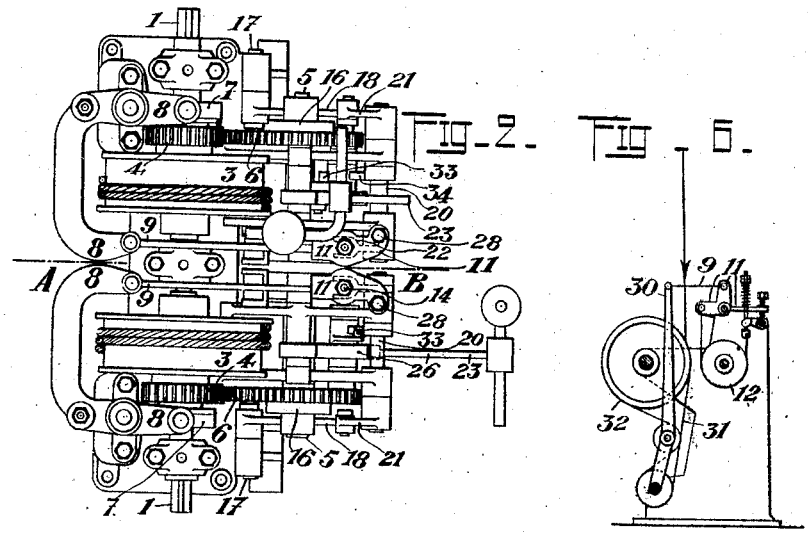
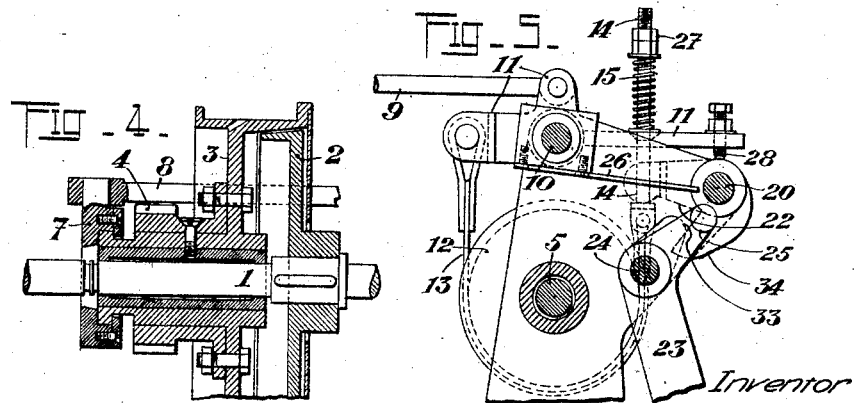
Inventor
F. Wüst Patented Feb. 24, 1925.

1,527,341

UNITED STATES PATENT OFFICE.

FRITZ WÜST, OF SELONCOURT, DOUBS, FRANCE.

RINGING MECHANISM FOR BELLS AND THE LIKE.

Application filed December 5, 1922. Serial No. 605,135.

*To all whom it may concern:*

Be it known that I, FRITZ WÜST, a citizen of the Swiss Republic, and resident of Seloncourt, Doubs, France, have invented a new and useful Ringing Mechanism for Bells and the like, of which the following is a full, clear, and exact specification.

This invention relates to power operated ringing mechanisms for bells and the like of the kind in which the oscillation of the bell is effected from a continuously driven shaft through a coupling mechanism which is rendered periodically operative.

According to the present invention the coupling mechanism, after being first rendered operative to commence the ringing of the bell is arranged to be automatically rendered operative and inoperative alternately and periodically through a movable controlling lever by means of a friction disc and band device acting thereupon in dependence of the oscillatory movement of the bell so as to alternately close or loosen the friction device for the purpose of actuating the said controlling lever.

The employment of a friction device for this purpose enables the required action to be effected more smoothly and quietly than is possible with the toothed gearing mechanism hitherto employed for the same purpose.

The invention is illustrated by way of example in the accompanying drawings of which—

Figure 1 is an end view of a ringing mechanism embodying one form of the invention, Figure 2 being a plan view thereof;

Figure 3 is a partial sectional end view similar to Figure 1 but showing the parts of the mechanism in a different position, Figure 4 illustrates the details of construction of the coupling mechanism employed, Figure 5 illustrating the details of construction of the friction device.

Figure 6 illustrates a modification of the mechanism shown in the preceding figures.

Referring now first to Figures 1 to 5 it will be sufficient to describe the mechanism for ringing one bell only of a pair, the mechanism belonging to the other bell being exactly similar to that of the first and the two mechanisms being arranged symmetrically relative to a central plane A—B as shown in Figure 2.

Rigidly secured to a shaft 1 (Figures 1–4), continuously driven, for instance, by an electric motor, is a driving disc 2, a coupling disc 3 being loosely mounted on the shaft 1 as shown in Figure 4. The coupling disc 3 is provided with a gear wheel 4 adapted to intermesh with a larger gear wheel 6 mounted upon a counter-shaft 5. The coupling disc 3 takes the form of a drum to which is attached a pulling mechanism for the bell constituted by an endless rope or cable which is wound in several turns on the drum 3 and passes over a wheel mounted on the shaft from which the bell is suspended (not shown). When the coupling disc or bell actuating drum 3 is engaged with the continuously rotating driving disc 2 the bell receives a driving impulse causing it to oscillate.

The coupling disc 3 is connected by means of a lever 8 and a rod 9 to a three-armed lever 11 pivotally mounted at 10 the lever 8 being connected to a sliding ring 7 engaging the hub of the coupling disc or bell actuating drum 3. A friction band 13 is connected to the lever 11 and passes round a drum 12 mounted on the counter-shaft 5, one end of the friction band 13 being directly connected to one arm of the lever 11, the other end of the band 13 being connected to the opposite arm of the lever 11 by means of a bolt 14 having an adjustable spring 15 (Figures 1, 3 and 5). The drum 12 owing to the provision of the gearing 4, 6, participates in the rotary movement of the coupling disc 3, and with the friction band band 13 constitutes the friction device hereinbefore referred to. On the countershaft 5 is also secured a cam disc 16 which co-operates with a lever 18 pivotally mounted at 17. The lever 18 is connected by means of a link 19 to an arm 21 mounted upon a rocking spindle 20 which is provided with a finger 22 adapted to engage with the lower end or head of the bolt 14 (Figures 3 and 5).

In order to render the coupling elements 2, 3 of the mechanism operative to commence the ringing operation a hand lever 23 is provided which is pivoted at 24 and carries a finger 25 adapted to engage with a leaf spring 26 mounted on a block secured to the shaft or pivot of the lever 11.

The operation of the mechanism above described is as follows:—

By rotating the hand lever 23 upwards to the position shown in Figure 3 the coupling disc 3 is moved into engagement with the driving disc 2, owing to the finger 25 engaging with the leaf spring 26 and thereby moving the lever 11 to the position shown in Figure 3, and this movement of the lever 11 being transmitted through rod 9 and lever 8 to cause the coupling disc 3 to engage with the rotating driving disc 2. The bell then receives its first driving impulse. After the first coupling action the coupling elements of the mechanism are automatically rendered inoperative and operative alternately. At the end of the first impulse, the bell swings by reason of inertia, somewhat over the position of equilibrium corresponding to the operative driving force, returning again immediately. At that part of the return stroke which corresponds to the said overswinging of the bell beyond the position of equilibrium, the bell acts through the pulling rope or cable and exerts a torque upon the coupling disc 3 which being transmitted through the gear 4, 6, to the disc 12, results in causing the latter to move in a direction opposite to that of the arrow $a$ (Figure 1) with the result that the friction band 13 immediately rocks the controlling lever 11 to disconnect the coupling disc 3 from the driving disc 2. During the subsequent part of the return swing of the bell the driving disc 2 can thus rotate freely within the coupling disc 3. At the completion of the return swing of the bell the reversal of its direction of movement will cause in a similar manner a rotational movement of the disc 12 in the direction of the arrow $a$, so that the friction band 13 will rock the lever 11 in the opposite direction and cause the re-engagement of the coupling to give the bell a fresh impulse. The disc 12 and the lever 11 thus oscillate to and fro, the disc 12 increasing its angle of oscillation at each swing, and this action continues with an ever increasing addition to the angle of deflection of the bell, until the bell has attained the normal range of swing. When this condition is reached the cam disc 16 comes into engagement with the cam lever 18, pressing this lever downwards and effecting through the elements 19, 20, 21 and the finger 22 (Figures 3 and 5) the downward movement of the bolt 14 to loosen the friction band 13 and to rock the lever 11 into the position corresponding to the release of the coupling elements 2, 3. Under these conditions, that is to say, when the bell is in full swing, the cam disc 16, before arriving at the end of its oscillation during the driving period acts through the lever 11 to disengage the coupling disc 3. By varying the angular position of the cam disc 16 the range of swing of the bell can be varied as desired.

It should be noted that during the driving period with the band 13 taut, that is, during the rotation of the disc 12 in the direction of the arrow $a$, the more firmly the coupling elements 2, 3 are in engagement the more the disc 12 through the band 13 tends to move the lever 11 to hold the coupling disc 3 in its coupled position. In this manner the coupling action is rendered very effective for the motor operated bell. This certainty of operation can be increased by compressing the spring 15 by rotating the nuts 27 so as thereby to increase the grip of the band 13 on the disc or drum 12.

An adjustable stop 28 secured to the lever 11 limits the range of deflection of this lever.

In the inoperative position of the mechanism the lever 23 is turned down. In this position a finger 33 carried by the lever 23 engages with a finger 34 on the spindle 20 and by means of the finger 22, which is also secured to this spindle, maintains the friction band 13 in a loosened condition.

The modified arrangement shown in Figure 6 differs from the construction above described in that the lever 11 co-operating with the friction device acts through the rod 9 on a lever 30 which serves to tighten a driving belt 31 through which the drive is transmitted to the drum 32 operating the bell.

Instead of a drum operating a pulling mechanism for the bell it is obvious that any other suitable device for effecting the swinging of the bell may be employed, for instance a gear wheel or toothed segment with lever gearing leading to the bell. It is also obvious that the lever 11, instead of acting on a friction coupling may be arranged to actuate an electric switch mechanism, for example, for rendering operative and inoperative an electromagnetic coupling.

What I claim is:—

1. A power operated ringing mechanism for bells and the like, comprising a continuously driven shaft, an actuating drum for the bell, arranged to be oscillated to and fro, coupling means for interconnecting said driven shaft and said actuating drum, a friction band brake device comprising a friction disc connected to said drum, a friction band round said friction disc and a rocking controlling lever to which are connected both ends of said friction band, and operating means to connect said controlling lever with said coupling means, so as to control same according to whether by grip or disengagement in said brake device, the controlling lever is rocked in the one or other direction.

2. A power operated ringing mechanism for bells and the like, comprising a continuously driven shaft, an actuating drum for the bell, arranged to be oscillated to and fro, coupling means for interconnecting said driven shaft and said actuating drum, a friction band brake device comprising a friction disc connected to said drum, a friction band round said friction disc and a rocking controlling lever to which are connected both ends of said friction band, an adjustable spring being inserted between one of said band ends and said controlling lever, and operating means to connect said controlling lever with said coupling means, so as to control same according to whether by grip or disengagement in said brake device, the controlling lever is rocked in the one or other direction.

3. A power operated ringing mechanism for bells and the like, comprising a continuously driven shaft, an actuating drum for the bell, arranged to be oscillated to and fro, coupling means for interconnecting said driven shaft and said actuating drum, a friction band brake device comprising a friction disc connected to said drum, a friction band round said friction disc and a rocking controlling lever to which are connected both ends of said friction band, operating means to connect said controlling lever with said coupling means, and a drive limit cam device arranged to cooperate with said controlling lever so as to cause the disengagement of said friction brake device when the bell has reached the desired range of swing.

In witness whereof I have hereunto signed my name this 21st day of November, 1922, in the presence of two subscribing witnesses.

FRITZ WÜST.

Witnesses:
AMAND BRAUN,
JULIA A. DURST.